Dec. 4, 1962
N. F. PEDERSEN
3,066,715
ANTI-SKID DEVICE
Filed Nov. 29, 1961
2 Sheets-Sheet 1
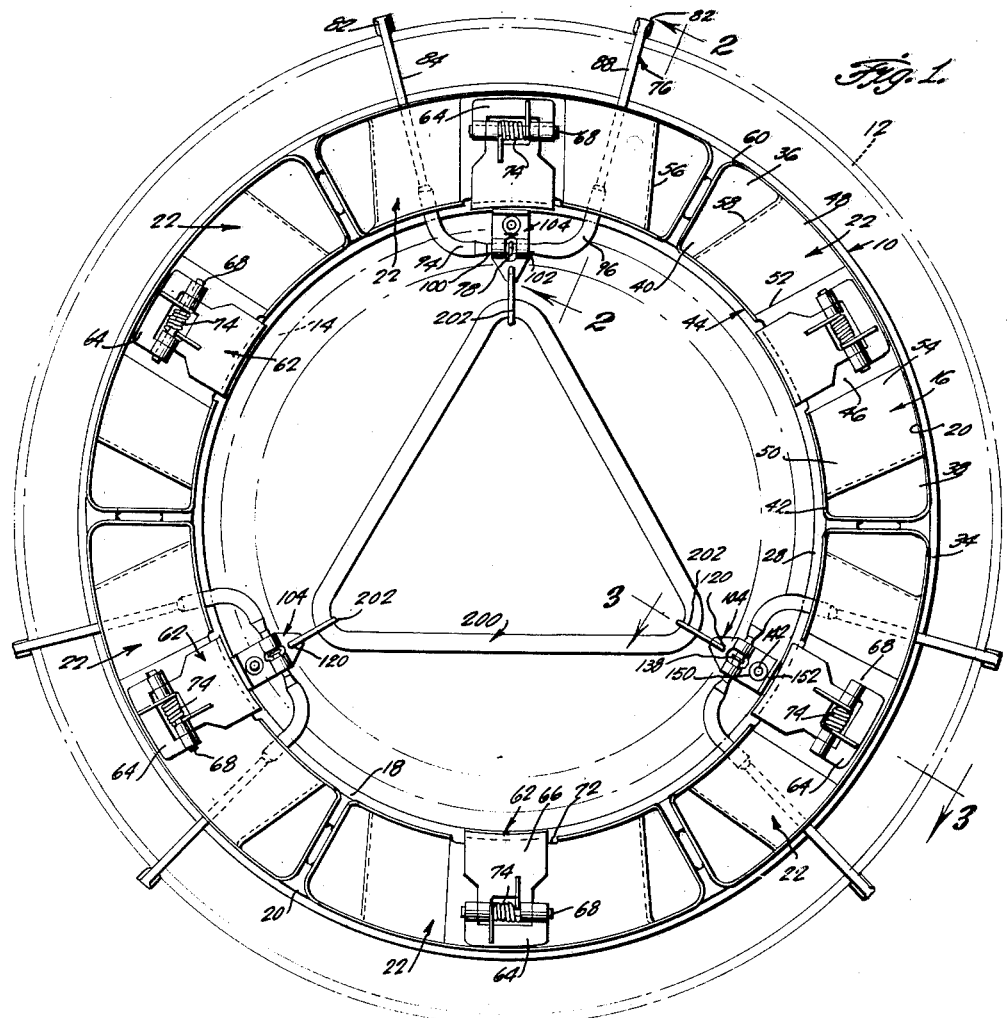
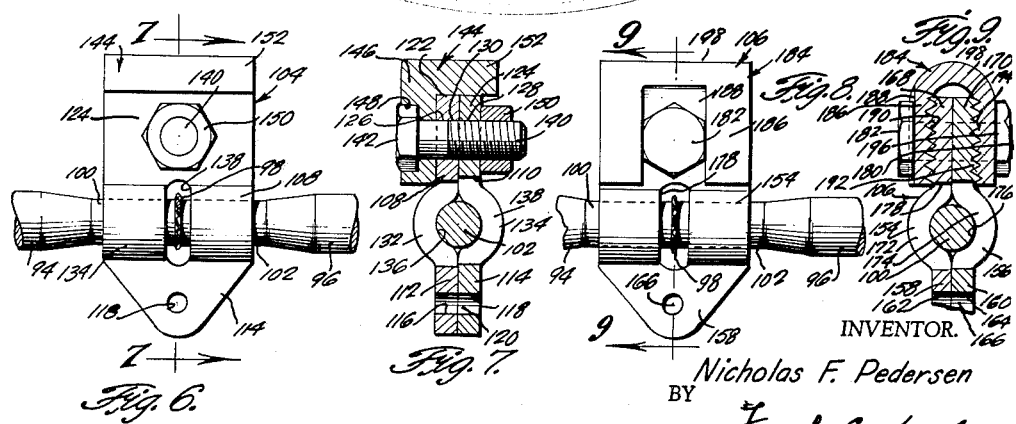
INVENTOR.
Nicholas F. Pedersen
BY
Frank C. Maley
agt.

Dec. 4, 1962 N. F. PEDERSEN 3,066,715
ANTI-SKID DEVICE
Filed Nov. 29, 1961 2 Sheets-Sheet 2
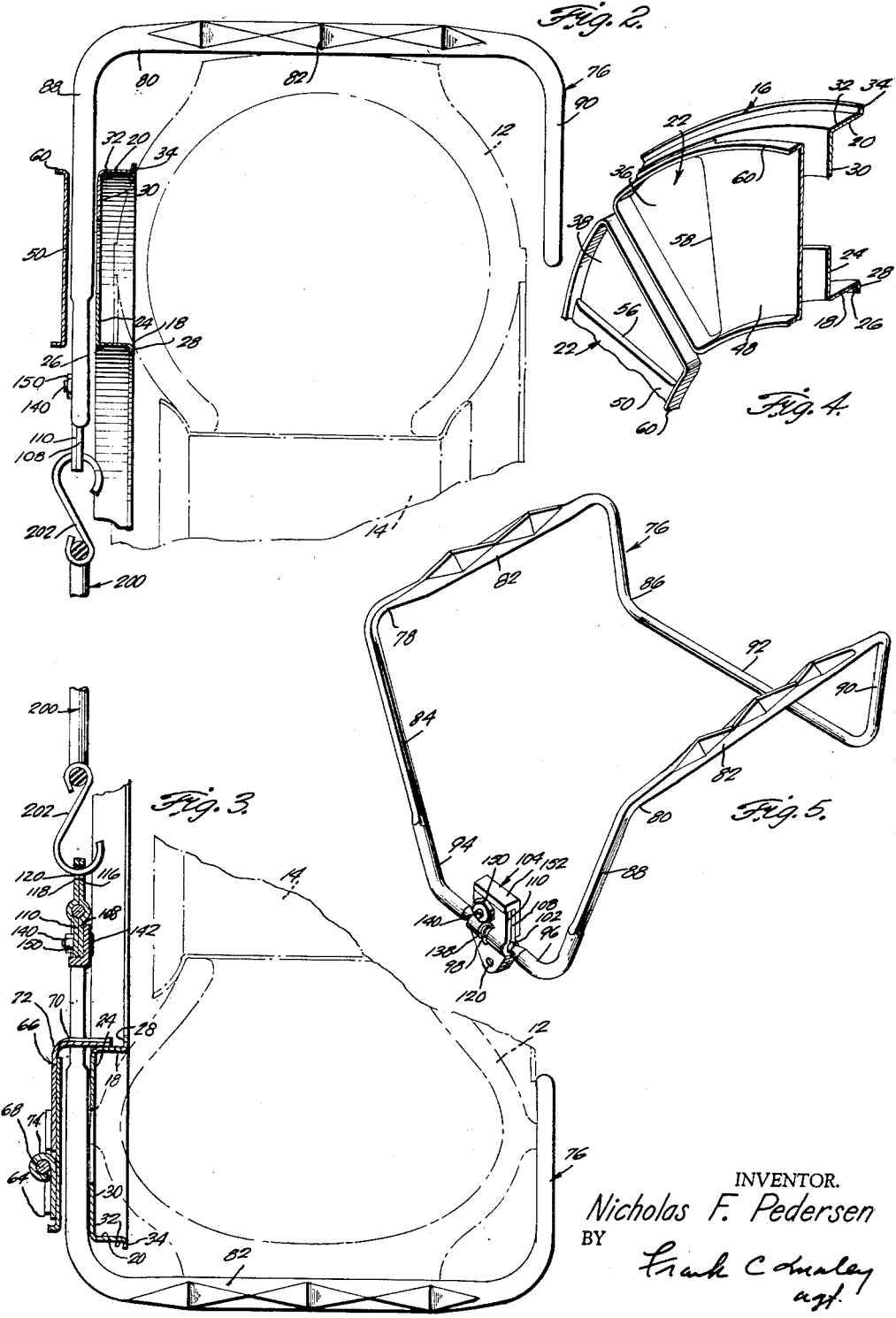
INVENTOR.
Nicholas F. Pedersen
BY

United States Patent Office 3,066,715
Patented Dec. 4, 1962

3,066,715
ANTI-SKID DEVICE
Nicholas F. Pedersen, 6861 N. Adams Road,
Birmingham, Mich.
Filed Nov. 29, 1961, Ser. No. 155,623
9 Claims. (Cl. 152—226)

This invention relates to anti-skid devices that are to be applied to and used with motor vehicle tires.

An object of this invention is to provide an anti-skid device that can, when an emergency arises, under prevailing road and weather conditions, be quickly and easily installed in operative position on a motor vehicle tire. Such installation being accomplished without the necessity of the tire on the motor vehicle being raised from contact with the road such as by the use of a jack or the like. It also removes the necessity of the person applying the anti-skid device having to crawl under the motor vehicle or lie on the road during the installation of the anti-skid device.

Another object of the invention is to provide an anti-skid device which is provided with anti-skid lugs that are arranged so that the cross members thereof are in pairs. Such construction adding stability to the cross members so that the cross members will not twist around the radial portion of the anti-skid lug and thus come off of the motor vehicle tire.

A further object of the invention is to provide an annular safety ring that has the periphery thereof of less dimension than the peripheral tread of a motor vehicle tire to which it is to be applied. The anti-skid lugs of the anti-skid device being loosely retained in the safety ring so that while the anti-skid lugs have freedom to move radially inward and to rock circumferentially when in contact with the road, the anti-skid lugs cannot pivot outwardly and thus be separated from the motor vehicle tire.

A still further object of the invention is to provide a hinged latch for the anti-skid lugs that prevent the anti-skid lugs from flying off because of the centrifugal force created by rotation of the motor vehicle tire.

A still further object of the invention is to provide a safety clip for the anti-skid device that controls the radial outward movement of the anti-skid lugs under centrifugal force. A tension cord being used with the safety clip to hold the same in a generally radial position to limit the radial outward movement of the lugs under centrifugal force while not resisting the radial inward movement of the anti-skid lugs caused by contact with the pavement and flexing of the tire casing.

With the above and other objects and advantages in view, the invention consists of the novel details of construction, arrangement and combination of parts more fully hereinafter described, claimed and illustrated in the accompanying drawings, in which:

FIG. 1 is an elevational view of anti-skid device embodying the invention, installed in operative position on a motor vehicle tire;

FIG. 2 is a transverse sectional view on the line 2—2 of FIG. 1, with the motor vehicle tire that is adjacent to one of the anti-skid lugs of the anti-skid device shown in unloaded position as when the position of the motor vehicle tire is furtherest removed from engagement with the road surface;

FIG. 3 is a transverse sectional view on the line 3—3 of FIG. 1 and is similar to FIG. 2 in that it shows the motor vehicle tire in loaded position such as when it is engagement with the road surface;

FIG. 4 is a detailed fragmentary perspective view of the annular safety ring of the anti-skid device;

FIG. 5 is an enlarged perspective view of one of the anti-skid lugs of the anti-skid device;

FIG. 6 is an elevational view, with parts broken away, of a safety clip of the anti-skid device that is not adjustable;

FIG. 7 is a vertical sectional view on the line 7—7 of FIG. 6;

FIG. 8 is an elevational view, with parts broken away, of an adjustable safety clip of the anti-skid device; and FIG. 9 is a vertical sectional view on the line 9—9 of FIG. 8.

Referring more in detail to the drawings, wherein like reference numerals are used to indicate like parts, the reference numeral 10 is used to designate the anti-skid device embodying the invention.

The anti-skid device 10 is to be mounted on a motor vehicle tire 12 that is of conventional design and is mounted in the conventional manner on a rim 14 that may or may not be an integral part of a motor vehicle wheel, as shown in FIG. 1.

Mounted in parallel contactual relation with the outer side of the motor vehicle tire 12 is an annular safety ring assembly 16 of the anti-skid device 10. The safety ring assembly 16 comprises an annular ring portion 18 that is of larger circumferential dimension than the rim 14 and an annular outer ring portion 20 that is of a smaller circumferential dimension than the tire 12, but is of a larger circumferential dimension than the inner ring portion 18. There is fixedly secured to the outer surfaces of the inner and outer ring portions 18 and 20, respectively, a plurality of sector-shaped pocket portions 22 and in the present illustration of the invention, six of the sector-shaped pocket portions 22 are shown secured to the inner and outer ring portions 18 and 20, respectively. The sector-shaped pocket portions 22 retain the inner and outer ring portions 18 and 20, respectively, in spaced fixed concentric relation to each other.

The inner and outer ring portions 18 and 20 are of Z formation in cross section and the inner ring portion 18 has a vertically disposed annular flange portion 24 to which the inner edges of the pocket portions 22 are secured, a horizontally disposed cylindrical body portion 26 which extends inwardly of the circular flange portion 24, at right angles thereto, and a depending annular flange portion 28 that depends from the body portion 26, at right angles thereto. The flange portion 24 extending upwardly from the horizontal plane of the body portion 26 and the flange 28 extending downwardly from the horizontal plane of the body portion 26. The outer ring portion 20 has a vertically disposed annular flange portion 30 to which the outer edges of the pocket portions 22 are secured, a horizontally disposed cylindrical body portion 32 which extends inwardly of the annular flange portion 30 at right angles thereto and an upwardly extending annular flange portion 34 that extends upwardly from the body portion 32 at right angles thereto. The flange 30 extends downwardly from the horizontal plane of the body portion 32 and is in the same vertical plane as the flange 24 of the inner ring portion 18. The flange 30 of the outer ring portion 20 being in spaced parallel relation to the flange 24 of the inner ring portion 18 and the flange 34 of the outer ring portion 20 extends upwardly from the horizontal plane of the body portion 32 in the same vertical plane as the flange portion 28 of the inner ring portion 18 and is in spaced parallel relation thereto. However, flange 34 and flange 28 may be spaced in parallel vertical planes to suit the contour of the tire. The inner and outer ring portions 18 and 20 are thus positioned in inverted relation to each other and are spaced from each other the height of the sector-shaped pocket sections 22, as shown in FIG. 4.

Each of the sector-shaped pocket sections 22 are specifically formed to carry out the function for which it has been designed and includes end portions 36 and 38, respectively, that are of substantially triangular formation with the apexes 40 and 42 thereof extending toward the center axis of the motor vehicle tire 12. The flange portions 24 and 30 of the ring portions 18 and 20, respectively, are secured to the opposite edges of the end portions 36 and 38, of each of the pocket portions 22, as by welding or the like, and thus the safety ring assembly 16 is held in rigid assembled position. The pocket portions 44 of each of the sections 22 comprise a central portion 46 that is in elevated relation to the flange portions 28 and 30 of the ring portions 18 and 20, respectively. Intermediate portions 48 and 50, respectively, are positioned on each side of the central portion 46 and along one longitudinal edge thereof are formed integral therewith by means of inclined flanges 52 and 54, respectively. The opposite longitudinal edges of the portions 48 and 50 are formed integral with the longitudinal edges of the end portions 36 and 38 by vertically disposed flanges 56 and 58, respectively, and a vertically disposed flange 60 is formed integral with the entire peripheral edges of each of the pocket portions 22.

Each of the central portions 46 has a hinged spring biased latch 62 associated therewith by having secured to the outer surface thereof a butt portion 64 and pivotally connecting a leaf portion 66 to the butt portion 64 by means of a lug pin 68. The free end of the leaf portion 66 has a right angularly disposed flange portion 70 integral therewith that extends through a slot 72 in the flange 60 to engage the outer surface of the flange 26 of the inner ring portion 18, as shown in FIG. 3. A coiled spring 74 that is mounted on the hinge pin 68 in circumjacent relation thereto and is secured to the outer surfaces of the butt portion 64 and leaf portion 66, biases the leaf portion 66 into engagement with the flange 26, as previously described.

In FIG. 5 there is shown an anti-skid, ground engaging lug 76 that is used in conjunction with the safety ring assembly 16, previously described. The lug 76 is formed of a continuous rod that is bent to provide a pair of cross members 78 and 80, respectively, and each of the cross members 78 and 80 have an outer serrated or saw tooth member 82 which is formed integral therewith by forging or the like. The saw tooth member 82 thus provides an outer non skid surface on the cross members 78 and 80. The cross member 78 has inwardly extended parallel side portions 84 and 86 formed integral with the opposite ends thereof and the cross member 80 has inwardly extended parallel side portions 88 and 90 formed integral with the opposite ends thereof. The free ends of the side portions 86 and 90 converge toward each other and are joined in spaced relation to each other by a horizontally disposed right angularly extending integral side portion 92. The side surfaces of the side portions 84 and 88 are flattened, as shown in FIG. 5, and they merge into end portions 94 and 96, respectively, that extend toward each other at right angles to their respective side portions 84 and 88 and the free reduced ends 100 and 102 thereof are secured together by a butt weld 98, as shown in FIGS. 6 and 8.

A safety clip assembly is pivotally mounted on the reduced ends 100 and 102 of the lug 76 and there are two types, the non-adjustable safety clip 104 of FIGS. 6 and 7 and the adjustable safety clip 106 of FIGS. 8 and 9.

In FIGS. 6 and 7, the safety clip assembly 104 is seen to comprise a pair of similar shaped sections 108 and 110, respectively, and each section includes a substantially triangular shaped end portion 112 and 114, respectively, and each of the end portions 112 and 114 has an opening 116 and 118, respectively, therein that are in alignment with each other and define a hook receiving passage 120. Each of the sections 108 and 110 has a substantially square shaped end portion 122 and 124, respectively, and each of the end portions 122 and 124 has an opening 126 and 128, respectively, therein that are in alignment with each other and define a bolt receiving passage 130. The end portions 122 and 124 are integrally joined by intermediate semi-circular portions 132 and 134, respectively, and these portions define therebetween a passage 136 that receives therein the reduced ends 100 and 102 of the lug 76. To permit a tight yet pivotal fit between the portions 132 and 134 and the reduced ends 100 and 102 of the lug 76, a cutout 138 is provided in each of the portions 132 and 134 to receive the butt weld 98, as seen in FIG. 6.

A bolt 140 having a hex-shaped head 142, extends the passage 130 and mounts on the safety clip assembly 104, a contact or spacing member 144, which is L-shaped in cross section and has a bolt receiving portion 146 that is in contact with the end portion 122, in which a hex or square shaped recess 148 is provided that receives therein the hex or square shaped head 142 of the bolt 140. Thus, when a nut 150 is threaded onto the bolt 140, the hex or square shaped recess 148 in the portion 146 prevents movement of the bolt 142. The other portion 152 of the member 144 extends over the edges of the end portions 122 and 124 in contact therewith and is adapted to engage and abut the flange portion 70 of the latch 62, as shown in FIG. 3.

In FIGS. 8 and 9, the safety clip assembly 106 is seen to comprise a pair of similar shaped sections 154 and 156, respectively, and each section includes a substantially triangular-shaped end portion 158 and 160, respectively, and each of the end portions 158 and 160 has an opening 162 and 164, respectively, therein that are in alignment with each other and define a hook receiving passage 166. Each of the sections 108 and 110 has a substantially square-shaped end portion 168 and 170, respectively, and each of the end portions 168 and 170 has an opening therein that defines a bolt receiving passage, not shown, see FIG. 7. The end portions 168 and 170 are integrally joined by an intermediate semi-circular portion 172 and 174, respectively, and these portions define therebetween a passage 176 that receives therein the reduced ends 100 and 102 of the lug 76. To permit a tight, yet pivotal fit between the portions 172 and 174 and the reduced ends 100 and 102 of the lug 76, a cutout 178 is provided in each of the portions 154 and 156, respectively, to receive the butt weld 98, as shown in FIG. 8.

A bolt 180 having a hex or square shaped head 182 extends through the bolt receiving passage, not shown, and mounts on the safety clip assembly 106, a contact or spacing member 184, which is U-shaped in cross section and has in the portion 186 thereof an open-ended elongated slot 188 which slidably receives the hex or square shaped head 182 of the bolt 180.

The outer surface of the end portions 168 and 170 is provided with serrations 190 and 192, respectively, that adjustably engage the serrations 194 in the inside of the spacing member 184. Thus, the spacing member 184 may be moved outwardly of or inwardly, toward the portions 172 and 174 to compensate for tire wear. When a nut 196 is threaded onto the bolt 180, the slot 188 in the portion 186 prevents movement of the bolt 180. In the safety clip assembly 106, previously described, it is bight portion 198 of the spacing member 184 that is adapted to engage and abut the flange portion 70 of the latch 62, as suggested by FIG. 3.

In assembling and mounting the anti-skid device 10 on the motor vehicle tire 12, as shown in FIG. 1, the lugs 76 are positioned on and extended over the tread and side walls of the motor vehicle tire 12. In FIG. 1, only three lugs are shown, but six may be used if desired. When three are used, the lugs may be positioned without raising the vehicle tire from contact with the road surface, but when six are used, five may be mounted and then the vehicle must be moved forward slightly to permit the sixth lug to be mounted, in each instance, however, the motor vehicle tire does not have to be jacked upwardly out of contact with the ground surface.

The safety ring assembly 16 is placed in contact with the side wall of the motor vehicle tire 12 and the side portions of the lugs 76 are extended through the intermediate portions 48 and 50 and the safety clip and that portion of the lug on which it is mounted is extended through the central portion 46. The latch 62 of the respective central portion being depressed to permit free passage of the safety clip 104 through the central portion 46. When the lugs are all in position and the respective latches 62 have been permitted to return to normal position, the flanges 70 thereon will engage and abut the contact or spacing member of the safety clip that is being used.

An endless tension member 200 of resilient formation having hook members 202 loosely mounted thereon is positioned within the safety ring assembly 16 so that the hook member 202 may be inserted into the hook receiving passage in the safety clip members that are being used. The anti-skid device 10 is thus retained in position on the motor vehicle tire 12.

The anti-skid lug has the cross members thereof arranged in pairs so that stability is added to the anti-skid lug and the lug cannot twist about on the motor vehicle tire and come off. The anti-skid lugs are loosely mounted in the sector-shaped pocket sections 22 so that they have freedom to move radially inward and to rock circumferentially when in contact with the pavement. Since the spacing of the safety clip from the safety latch determines the radial movement of the anti-skid lugs, the non-adjustable type, FIGS. 6 and 7, are used with new motor vehicle tires only. If the motor vehicle tires are worn, different sizes of this type of safety clip would have to be used, however, with the type of safety clip shown in FIGS. 8 and 9, such clips can be used with new motor vehicle tires and adjusted as the motor vehicle tires become worn.

The safety latch prevents the anti-skid lugs from flying off under the effects of centrifugal force because the tension member does not resist centrifugal force, but is used only for retaining the safety clips in position.

When the motor vehicle is in motion, the side walls of the motor vehicle tire will spread into the safety ring assembly, as shown in FIG. 3, when that portion of the motor vehicle tire is in contact with a road surface and thus more firmly retain the anti-skid device on the motor vehicle tire.

There has thus been provided an anti-skid device which by the use of a combination of three anti-skid lugs may be used under emergency conditions or with the use of six anti-skid lugs may be used for full traction and road travel.

It is believed, therefore, that the construction and operation of the anti-skid device will be clear and understandable to those skilled in the art and it is to be understood that changes in the minor details of construction, arrangement and combination of parts may be resorted to provided they fall within the spirit of the invention and the scope of the appended claims.

Having thus described the invention what is claimed as new and desired to be protected by Letters Patent is:

1. In an anti-skid device for a motor vehicle tire the combination including anti-skid means mounted on said tire and extending transversely and laterally thereof, means for removably retaining said anti-skid means in position on said tire and means connected to said anti-skid means to permit radial and circumferential movement of said anti-skid means while retaining said anti-skid means in position against the action of centrifugal force, said means for removably retaining said anti-skid means in position comprising inner and outer circular members that are in spaced parallel relation to each other and a plurality of sector-shaped sections connected at their outer longitudinal edges to said inner and outer circular members.

2. The combination as in claim 1, wherein said anti-skid means is formed of a single length of material that is formed to provide a U-shaped formation.

3. The combination as in claim 2, wherein said anti-skid means comprises a pair of parallel spaced cross members, a pair of inwardly inclined side members connected to the opposite ends of said cross members and a pair of horizontally disposed side members connecting the opposite ends of said side members to form a unitary construction of U-formation.

4. The combination as in claim 1, wherein clip members are connected to said anti-skid means and the means for permitting radial and circumferential movement is connected to said clip members.

5. The combination as in claim 4, wherein said clip members are adjustable to compensate for wear of the motor vehicle tire.

6. The combination as in claim 1, wherein the means connected to said anti-skid means to permit radial and circumferential movement is of an endless resilient construction and is provided with a plurality of hook members to connect said means to said anti-skid means.

7. The combination as in claim 1, wherein said sector-shaped sections has a central portion that is positioned in elevated relation to the side wall of said motor vehicle tire, intermediate sections positioned integrally with said central portion and inwardly thereof and a pair of attaching end portions that are integral with and inwardly of said intermediate portions and secured to said inner and outer circular members.

8. The combination as in claim 7, wherein a safety latch means is fixed to the central portion of said sector-shaped section and said latch means engages said anti-skid means to retain said anti-skid means in position in said sector-shaped sections.

9. The combination as in claim 4, wherein said clip members comprise a pair of similar shaped sections each having outer end portions and intermediate semi-circular shaped portions and a spacer member is movably connected to one of the outer end portions thereof.

References Cited in the file of this patent

UNITED STATES PATENTS

| | | |
|---|---|---|
| 2,290,398 | Wellington | July 21, 1942 |
| 2,553,849 | Dines | May 22, 1951 |
| 2,598,298 | Pindjak | May 27, 1952 |